United States Patent [19]

Wycoff et al.

[11] 3,733,554

[45] May 15, 1973

[54] COMMUNICATION RECEIVER WITH TONE OPERATED AUDIO AMPLIFIER CIRCUITRY

[75] Inventors: Keith H. Wycoff, Lexington, Nebr.; Delane A. Wycoff, Iowa City, Iowa

[73] Assignee: Keith H. Wycoff, by said Delane A. Wycoff

[22] Filed: Mar. 19, 1971

[21] Appl. No.: 126,014

[52] U.S. Cl. ....................325/478, 325/466

[51] Int. Cl. ....................H04n 1/10

[58] Field of Search....................325/64, 55, 392, 325/389, 390, 466, 492, 478

[56] References Cited

UNITED STATES PATENTS

| | | | |
|---|---|---|---|
| 3,486,119 | 12/1969 | Shimada | 325/466 |
| 3,387,212 | 6/1968 | Kaufman | 325/466 |
| 3,628,153 | 12/1971 | Fukata | 325/395 |

*Primary Examiner*—Richard Murray
*Assistant Examiner*—Barry L. Leibowitz
*Attorney*—Prangley, Clayton, Mullin, Dithmar, & Vogel

[57] ABSTRACT

The receiver has a processing circuit which detects the control tone in the intelligence in the RF carrier wave, a decoder circuit responsive to the control tone for generating a control signal, an electronic switch responsive to the control signal to provide an enabling signal which persists for a predetermined time interval, an audio amplifier circuit which is operative to amplify intelligence from the processing circuit for the predetermined time interval when the control tone is present, a speaker for converting the detected intelligence into sound waves, a switch coupling a source of override signal to the electronic switch and to the audio amplifier circuit, the switch being movable to one position for coupling the override signal to the electronic switch and to the audio amplifier circuit respectively to disable the electronic switch and to maintain the audio amplifier circuit operative irrespective of whether a control tone is received the switch being movable to a second position to decouple the override signal from the audio amplifier circuit and thereby render the same inoperative.

14 Claims, 1 Drawing Figure

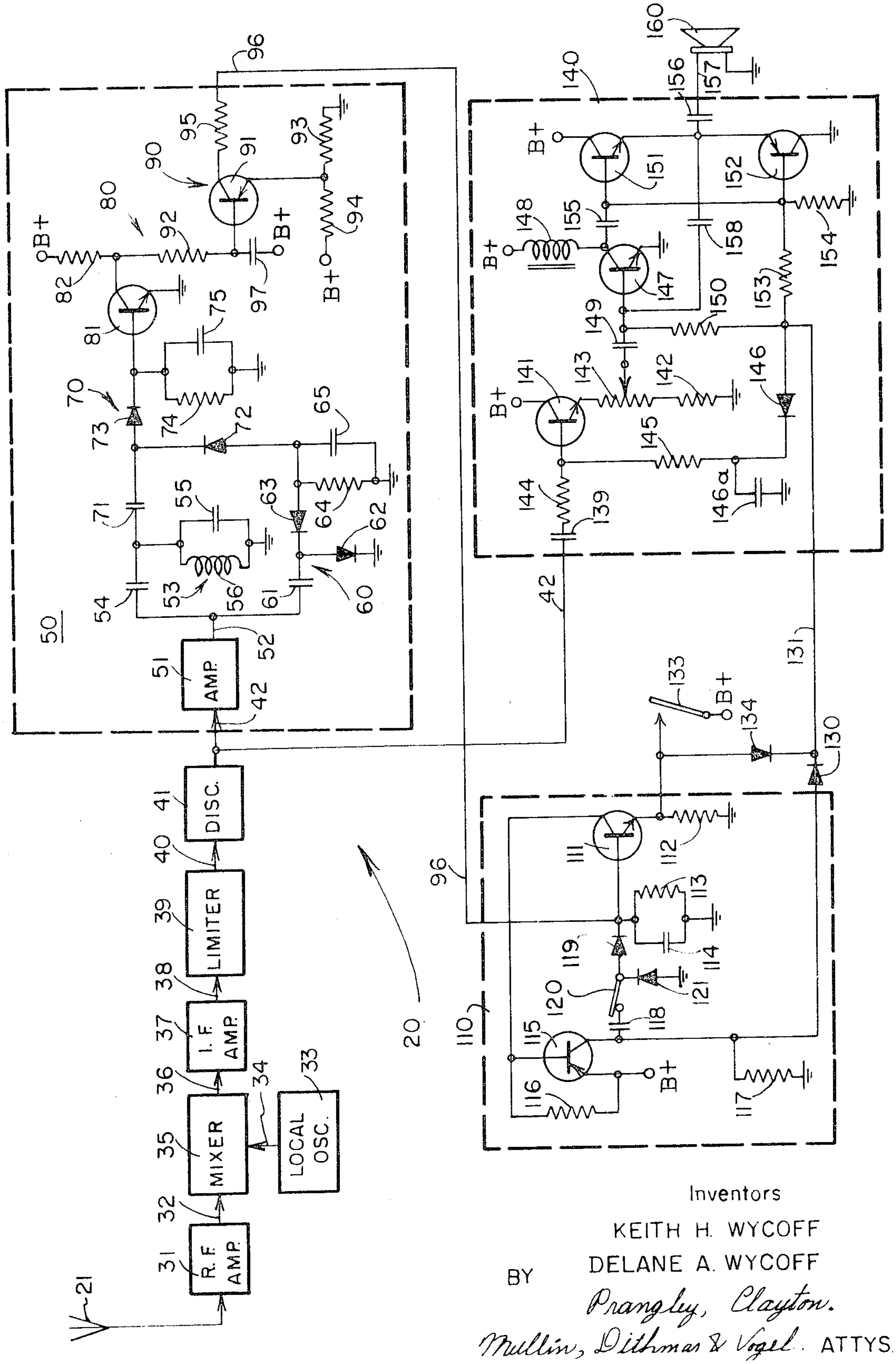
Inventors
KEITH H. WYCOFF
DELANE A. WYCOFF
BY
Prangley, Clayton,
Mullin, Dithmar & Vogel. ATTYS.

COMMUNICATION RECEIVER WITH TONE OPERATED AUDIO AMPLIFIER CIRCUITRY

The present invention is directed to communication receivers, and particularly to a communication receiver having an audio amplifier circuit which is rendered operative in the presence of a specified control tone in the incoming radio frequency carrier wave.

It is an important object of the present invention to provide an improved receiver of the type in which the audio amplifier circuitry is activated for a predetermined time interval when the proper control tone or tones are present in the incoming carrier wave.

Another object of the invention, is to enable an operator of such a receiver to deactivate the audio amplifier circuitry at any time during the predetermined time interval.

Still another object of the invention is to enable the operator of such a receiver to activate the audio amplifier circuitry at any time without having to activate the circuitry for a full predetermined time interval.

Yet another object is to provide a receiver which is capable of being switched between two distinct modes of operation: on the one hand, one in which the audio amplifier circuitry is automatically activated for a predetermined time interval to enable it to translate the voice message; and, on the other hand, one which is automatically activated until the termination of the control tone or tones, after which the audio amplifier circuitry must be manually activated.

In summary, there is provided a communication receiver for receiving carrier signals modulated by at least one control tone and intelligence, the receiver comprising a processing circuit for receiving the modulated signals and detecting the control tone and the intelligence therein, a decoder circuit coupled to the processing circuit and responsive to the control tone for generating at the output thereof a control signal, an electronic switch coupled to the output of the decoder circuit and responsive to the control signal to provide an enabling signal, the electronic switch including a timer to cause the enabling signal to extend for a predetermined time interval beyond the termination of the control tone, an audio amplifier circuit having a first input coupled to the processing circuit and a second input coupled to the electronic switch, the audio amplifier circuit being rendered operative by the enabling signal for the predetermined time interval to amplify the detected intelligence from the processing circuit, a speaker coupled to the output of the audio amplifier circuit to convert the amplified detected intelligence into sound waves, and a switch coupling a source of override signal to the electronic switch and to the audio amplifier circuit, the switch being movable to a first position for coupling the override signal to the electronic switch and to the audio amplifier circuit respectively to disable the electronic switch and to maintain the audio amplifier circuit operative irrespective of whether the control tone is received, the switch being movable from the first position to a second position to decouple the override signal from the audio amplifier circuit and thereby render the audio amplifier circuit inoperative.

There may be also provided a manually-operated switch which selectively couples the timer in the electronic switch so that when the manual switch is closed, the enabling signal extends for a predetermined time interval beyond the termination of the control tone, whereas, when the switch is open, the enabling signal terminates with the end of the control tone.

Further features of the invention pertain to the particular arrangement of the elements of the communication receiver, whereby the above outlined and additional operating features thereof are attained.

The invention, both as to its organization and method of operation, together with further objects and advantages thereof, will best be understood by reference to the following specification taken in connection with the accompanying drawing, which depicts a diagram, partially in block and partially in schematic, of a communication receiver made in accordance with and embodying the principles of the present invention.

The principles of the present invention are equally applicable to a communication system utilizing lines, modulated supersonic signals, AM radio signals, and FM radio signals. For illustrative purposes, there is shown in the drawings, a communication system employing FM radio signals. Those skilled in the art will readily understand that the various principles to be described hereinafter in conjunction with the system employing FM radio signals can be readily adjusted to the other types of communications systems using other forms of transmissions such as those set forth above.

Referring now to the drawing, there is shown a communication receiver made in accordance with and embodying the principles of the present invention, the receiver being generally designated by the numeral 20. The receiver 20 is adapted to receive an RF carrier modulated by audio signals and one or more control tones. The transmissions are received by the receiver 20 at the antenna 21 thereof which is connected to a processing circuit that processes the modulated RF carrier and converts it into a demodulated composite signal comprised of the audio signals and the control tone. Specifically, the carrier signal is picked up by the antenna 21 and is conveyed to the input of a radio frequency amplifier 31. The output of the radio frequency amplifier 31 is applied by a conductor 32 as one of the inputs to a mixer 35, the usual local oscillator 33 being provided and having the output thereof connected by a conductor 34 as a second input to the mixer 35. The intermediate frequency (IF) signal which is the output of the mixer 35 is applied by a conductor 36 as the input to an IF amplifier 37, the output of which is transmitted by a conductor 38 to the input of a limiter 39. The output of the limiter 39 appears on a conductor 40 and is the input to the discriminator 41, the output of the discriminator being a composite demodulated signal appearing on the conductor 42. The composite demodulated signal includes audio signals for coupling via conductor 42 to the audio amplifier 140.

The composite demodulated signal present on the conductor 42 also includes a control tone which is applied to a decoder 50, the decoder 50 including an amplifier 51 connected to the conductor 42 and having its output coupled via a conductor 52 to a tone filter 53. The tone filter 53 includes capacitors 54 and 55 coupled in series and an inductor 56 coupled in parallel with the capacitor 55. A capacitor 71 is coupled to the junction of the capacitors 54 and 55. The decoder 50 further comprises a reference circuit 60 including an input capacitor 61 connected to the conductor 52 and a diode 62 connected to ground. There is also provided a diode 63 connected between the junction of the capacitor 61 and the diode 62 to a filtering network comprising a resistor 64 and a capacitor 65 coupled in parallel to ground. The decoder 50 further includes a rectifying circuit having a pair of diodes 72 and 73 coupled in series from the anode of the diode 63, the capacitor 71 being coupled to the junction of the diodes 72 and 73. The rectifying circuit also includes a resistor 74 and a capacitor 75 connected in parallel from the cathode of the diode 73 to ground to provide filtering for the rectified voltage.

The amplified signal containing the control tone and noise, on the conductor 52 will be rectified in the reference circuit 60 and will be filtered thereby to provide a reference voltage applied to the anode of the diode 72. If the signal on the conductor 52 includes the control tone to which the filter 53 is tuned, the filter 53 will develop its maximum voltage which is applied to the cathode of the diode 72. In order to provided an output from the diode 73, the control tone appearing at the cathode of the diode 72 must have a peak-to-peak value in excess of the reference voltage on the anode of the diode 72, before the diode 72 will conduct to provide an output. In effect there is provided a filter 53 followed by a voltage doubler circuit (the tone rectifier circuit 70) which is biased in such a way that there is no DC output voltage from the diode 73 until the reference voltage on the anode of the diode 72 is exceeded. Thus, the bandwidth over which the tone produces a DC output voltage can be readily controlled by controlling the relationship between the filter output voltage and the reference voltage. With the particular filter shown, for example, the capacitor 54 may be increased in value to produce a greater tone output and consequently a wider bandwidth or lessened in value to similarly produce a narrower bandwidth.

The decoder 50 further includes an electronic switch 80 comprised of an NPN transistor 81 having its emitter grounded and its collector coupled through a resistor 82 to a supply voltage, the base being coupled to the cathode of the diode 73. There is provided an output stage 90 consisting of a PNP transistor 91 having its base coupled through a resistor 92 to the collector of the transistor 81. The emitter of the transistor 91 is coupled to ground via a resistor 93 and is coupled to the source of supply voltage by a resistor 94, whereby the resistor 93 and 94 function as a voltage divider to provide a reference voltage on the emitter of the transistor 91. The collector of the transistor 91 is coupled by a resistor 95 to an output conductor 96. A source of supply voltage is applied to the base of the transistor 91 via the resistors 82 and 92. A capacitor 97 coupled to the resistor 92 defines therewith a time delay network.

The rectified and filtered DC voltage appearing at the base of the transistor 81 in the presence of the proper control tone causes conduction of the transistor 81, which provides a path for current flow from the capacitor 97, through the resistor 92 and the collector and the emitter of the transistor 81, thereby grounding one terminal of the capacitor 97. As soon as the potential at the terminal of the capacitor 97 connected to the base of the transistor 91 drops below the emitter voltage, the transistor 91 will begin to conduct heavily to place a positive voltage on the conductor 96, which acts as a control signal. The charging of the capacitor 97 effectively delays the time at which the control signal appears on the conductor 96, by an amount depending on the RC time constant of the capacitor 97 and the resistor 92.

There is provided an electronic switch 110, which, in the embodiment shown, in a monostable multivibrator and includes an NPN transistor 111 having its emitter coupled to ground via a resistor 112 and having its base coupled to ground by way of a resistor 113 and a capacitor 114 coupled in parallel. There is also provided a PNP transistor 115 having its base connected directly to the collector of the transistor 111, its collector connected through a resistor 117 to ground and its emitter connected to the source of supply voltage, a resistor 116 being connected between the base and the emitter of the transistor 115. The collector of the transistor 115 is coupled by way of a capacitor 118, a switch 120 and a diode 119 to the base of the transistor 111. A diode 121 is coupled between ground reference potential and the junction of the switch 120 and the diode 119. The conductor 96 which carries the delayed control signal from the decoder 50 is coupled to the base of the transistor 111. The diode 130 couples the collector of the transistor 115 to a conductor 131. There is provided a switch 133 coupled between the source of $B^+$ operating potential and the emitter of the transistor 111. The switch 133 is also coupled via a diode 134 to the conductor 131.

In operation, the appearance of the delayed control signal on the conductor 96 causes conduction of the transistor 111 which provides a path for current flow from the source of supply voltage through the base-emitter junction of the transistor 115 and the collector and the emitter of the transistor 111. This renders the transistor 115 highly conductive so as to provide current flow through its collector and its emitter and the resistor 117 and thereby cause conduction of the diode 130 to place the supply voltage on the conductor 131. The supply voltage becomes an enabling signal for rendering the audio amplifier 140 operative, as will be explained presently. The capacitor 114 must be charged by the control signal on the conductor 96 before the transistor 111 will conduct. Thus, the capacitor 114 introduces a slight delay to prevent the electronic switch 110 from producing the enabling signal in the presence of a static charge. The isolating diode 119 prevents the control signal on the conductor 96 from being applied to the capacitor 118. The diode 121 provides a rapid discharge path for the capacitor 118.

During the conduction periods of the transistors 111 and 115, current flows from $B^+$ through the collector and the emitter of the transistor 115, through the capacitor 118 and through the base-emitter junction of the transistor 111 to charge the capacitor 118. Accordingly, when the control signal on the conductor 96 is removed by virtue of the control tone terminating, the transistor 111 remains conductive because the capacitor 118 has a charge thereon, which charge leaks off through the base-emitter junction of the transistor 111 and the resistors 112 and 113. Of course, the conduction of the transistor 111 maintains the transistor 115 conductive to maintain the enabling voltage on the conductor 131 for a time interval determined by the RC time constant of the switch circuit 110, that is, the resistors 112 and 113 and the capacitor 118. By selecting the value of those parts, the time period that the enabling signal remains on the conductor 131 may be controlled.

The audio amplifier 140 includes a first stage of amplification consisting of an NPN transistor 141 having its emitter coupled through a volume-control potentiometer 143 and a resistor 142 to ground. The collector of the transistor 141 is coupled to the source of supply voltage and its base is coupled by a resistor 144 and a capacitor 139 to the conductor 42. A bias voltage is derived by a resistor 145 and a diode 146 coupled in series from the conductor 131 to the base of the transistor 141. A capacitor 146*a* is coupled from the junction of the resistor 145 and the diode 146 to ground. There is also provided a second stage of amplification consisting of an NPN transistor 147 having its emitter on ground, its collector coupled through a choke 148 to the source of supply voltage and its base coupled through a capacitor 149 to the movable arm of the potentiometer 143. Bias voltage for this transistor is supplied by a resistor 150 coupled between its base and the conductor 131. There is also provided a third stage of amplification consisting of a pair of complementary symmetry transistors 151 and 152, the base voltage for these transistors being supplied by the voltage divider consisting of resistors 153 and 154 connected between the conductor 131 and ground. The collector of the transistor 147 is coupled through the capacitor 155 to the connected-together bases of the transistors 151 and 152. The collectors of the transistors 151 and 152 are respectively coupled to $B^+$ and ground. The emitters of the transistors 151 and 152 are connected together and through a capacitor 156 to an annunciator such as the speaker 160. Also, a capacitor 158 is coupled between the base of the transistor 147 and the emitters of the transistors 151 and 152, which capacitor functions to decrease crossover distortion.

In operation, the enabling signal appearing on the conductor 131 in response to a control tone, is applied through the diode 146 and the resistor 145 to establish a positive voltage on the base of the transistor 141 and thereby render it conductive. The diode 146 and the capacitor 146*a* act to filter the DC voltage being applied by the electronic switch 110 by way of the conductor 131. Similarly, the enabling signal on the conductor 131 is applied through the resistor 150 to the transistor 147 to render it conductive also. Also, the enabling signal provides a bias voltage across the resistor 154 for the transistors 151 and 152. In this condition, audio signals on the conductor 42 will be amplified by the transistor 141, then by the transistor 147 and power amplified by the transistors 151 and 152. The potentiometer 143 functions as a volume control and is accessible to the user of the receiver. Of course, without the enabling signal on the conductor 131, none of the transistors 141, 147, 151 or 152 are operative to amplify the audio signals on the conductor 42. It is thus desirable that the RC time constant in the electronic switch circuit 110 be selected to be long enough to maintain the audio amplifier 140 operative for the duration of the audio information.

As previously explained, the electronic switch 110 produces an enabling signal for a time interval determined by the values of the resistors 112 and 113 and the capacitor 118. The interval commences at some time after the commencement of the control tone, which delay is determined by the values of the resistor 92 and the capacitor 97. If, for example, the duration of the enabling signal was 20 seconds, the audio amplifier 140 would be operative for 20 seconds. If the voice message commenced upon completion of the last control tone of the series of control tones and the voice message were for example 5 seconds long, the audio amplifier would be on for approximately 15 seconds after termination of the voice message, after which time the enabling signal on the conductor 131 would disappear and thereby disable the audio amplifier 140. During this 15 second interval, the audio amplifier is of course producing noise which is emitted by the speaker 160. The instant invention allows the user to "turn off" the audio amplifier 140 upon completion of the voice message so as to preclude the noise from being emitted. Also, if the power supply is a battery, the useful life thereof is increased since the audio amplifier draws current for less overall time.

Specifically, when the user closes the switch 133, he causes the $B^+$ operating voltage, which may be viewed as an override signal, to be applied to the emitter of the transistor 111, thereby turning off the transistor 111, which, in turn, turns off the transistor 115 to prevent the $B^+$ operating voltage from being applied through the transistor 115 to the conductor 131. However, the override signal is applied through the switch 133 and the diode 134 to the conductor 131, to maintain the audio amplifier 140 operative for as long as the switch 133 is closed. When the switch 133 is then opened, the override signal is no longer present on the conductor 131, nor is the enabling signal present thereat since the electronic switch 110 is effectively opened. The isolating diode 134 prevents application of the enabling signal on the collector of the transistor 115 from being applied to the emitter of the transistor 111. The isolating diode 130 prevents application of the override signal to the transistor 115.

Preferably, the switch 133 is of the push-button variety and is spring biased to its open position. Thus, for example, if the electronic switch has been set to maintain the audio amplifier 140 on for 20 seconds, and the voice message lasts for 5 seconds after the electronic switch 110 has been closed, the user need only depress the switch 133 to deactivate the electronic switch 110 to remove the enabling signal from the conductor 131, and immediately release the switch 133, whereupon the override signal is removed from the conductor 131, so as to disable the audio amplifier 140. Thus, the user need not be annoyed with noise coming from the speaker 160.

Also, with this type of system, the user may monitor the channel to which his receiver is tuned without having to listen to the entire message. Specifically, if the user wants, at any instant of time, to hear what is on the channel, he merely depresses the switch 133 and maintains it depressed for as long as he wants to hear the message. This causes the enabling signal, a timed signal, to be replaced by the override signal, a non-timed signal. As soon as he releases the switch 133, the override signal present on the conductor 131 will decay, thereby deactivating the audio amplifier 140.

The electronic switch 110, as has been previously pointed out, in the embodiment shown, is a monostable multivibrator, that is, it has two output conditions. In its first condition, both transistors 111 and 115 are off and no enabling signal is provided on the conductor 131. A trigger pulse applied via the conductor 96 causes both transistors 111 and 115 to revert to their "on" states, and thereby place the monostable multivibrator into its second condition. After a time interval determined by the values of the resistors 112 and 113 and the capacitor 118, the monostable multivibrator automatically returns to its first condition to discontinue production of the enabling signal. The override signal operates to place the monostable multivibrator at any desired time into its first condition.

In this type of system, the operator's use of his hands is minimized. Specially, if his receiver is to be activated, the proper control tone will automatically turn on his receiver and enable him to hear the voice message. After the predetermined time interval has lapsed, the receiver again reverts to its stand-by condition. Thus, in the normal sequence of events, the user need not use his hands at all. However, if he wants to deactivate the audio amplifier 140 prior to the termination of the interval or if he wants to monitor the channel, he merely depresses the switch 133.

In the above explanation, it has been assumed that the switch 120 was closed in which case the receiver is used in its tone and voice mode. By opening the switch 120, the timing means consisting of resistors 112 and 113 and the capacitor 118 are effectively removed from the electronic switch 110. Then, the appearance of the control signal on the conductor 96 will cause conduction of the transistors 111 and 115 in the manner previously explained to cause the enabling signal to appear on the conductor 131. However, upon termination of the control signal on the conductor 96, the transistors 111 and 115 immediately return to their "off" states and thereby cause the enabling signal on the conductor 131 to terminate. As was previously explained, the control signal on the conductor 96 terminates effectively at the same time as the control tone. Thus, with the switch 120 open, the audio amplifier 140 will be operative only until termination of the control tone. Since the enabling signal on the conductor 131 commences slightly after the commencement of the last control tone, the speaker 160 will emit a tone having the frequency of the control tone which is applied along the conductor 42, which tone will persist from a time subsequent (because of the delay introduced by the capacitor 97 and the resistor 92) to the commencement of the control tone and terminates with the control tone. If the user wishes to hear the ensuing message, he merely depresses the switch 133 and holds it down as long as needed to hear the message. This mode of operation finds particular use when any audio would be annoying to others. For example, in a church, the user may place his switch 120 in the open condition, so that, when he is paged, all that he and the surrounding people hear is the end of the last control tone. This would usually take the form of a "beep" and thus would not be too bothersome. He then can leave the room quickly and depress the switch 133 to hear the voice message which follows.

One further advantage of the system herein described is the improved battery life attained when the power supply is a battery. Specifically, the audio amplifier 140 can be turned off upon termination of the message to reduce battery drain. Also, if the user wants to monitor the channel, the audio amplifier need not be on for the full time interval. Finally, if the switch 120 is open, battery drain is reduced since the audio amplifier 140 is activated only for the duration of the control tone.

Although there has been illustrated and described a certain preferred embodiment of the invention, it is to be understood that various changes and modifications can be made therein without departing from the spirit and scope of the invention, and it is intended that all such changes and modifications be covered as fall within the scope of the appended claims.

What is claimed is:

1. A communication receiver for receiving carrier signals modulated by at least one control tone and intelligence, said receiver comprising a processing circuit for receiving the modulated signals and detecting the control tone and the intelligence therein, a decoder circuit coupled to said processing circuit and responsive to the control tone for generating at the output thereof a control signal, electronic switching means coupled to the output of said decoder circuit and responsive to the control signal to provide an enabling signal, said electronic switching means including timing means to cause said enabling signal to extend for a predetermined time interval beyond the termination of the control tone, an audio amplifier circuit having a first input coupled to said processing circuit output and a second input coupled to said electronic switching means, said audio amplifier circuit being rendered operative by said enabling signal for said predetermined time interval to amplify the detected intelligence from said processing circuit, a speaker coupled to the output of said audio amplifier circuit to convert the amplified detected intelligence into sound waves, and a manual override switch coupling a source of override signal to said electronic switching means and to said audio amplifier circuit, said manual override switch being movable to a first position for coupling said override signal to said electronic switching means and to said audio amplifier circuit respectively to disable said electronic switching means and to maintain said audio amplifier circuit operative irrespective of whether said control tone is received, said manual override switch being movable from said first position to a second position to decouple said override signal from said audio amplifier circuit and thereby render said audio amplifier circuit inoperative.

2. The communication receiver set forth in claim 1, wherein said electronic switching means is a monostable multivibrator.

3. The communication receiver set forth in claim 1, wherein said electronic switching means includes a first transistor of one polarity having an input electrode and an output electrode and a second transistor of an opposite polarity having an input electrode and an output electrode, said timing means coupling the output electrode of one transistor to the input electrode of the other transistor, and the output electrode of said other transistor being coupled to the input electrode of said one transistor, the output of said decoder circuit being coupled to the input electrode of said other transistor, the output electrode of said one transistor being coupled to said audio amplifier circuit.

4. The communication receiver set forth in claim 1, wherein said electronic switching means is a monostable multivibrator having first and second conditions, said monostable multivibrator normally being in said first condition and being switchable to said second condition by said enabling signal, said monostable multivibrator automatically reverting to said first condition upon termination of said predetermined time interval, said override signal being operative to cause said monostable multivibrator to revert to said first condition.

5. The communication receiver set forth in claim 1, wherein said manual override switch is spring-biased to the second position thereof.

6. The communication receiver set forth in claim 1, wherein said manual override switch includes a button which, when depressed, is placed in said first position and which, when released, springs outwardly to said second position thereof.

7. The communication receiver set forth in claim 1, and further comprising a first isolating diode coupling said switch to said audio amplifier circuit, and a second isolating diode coupling said electronic switching means to said audio amplifier circuit.

8. The communication receiver set forth in claim 1, wherein said mechanical override switch is coupled in series with the source of override signal, said mechanical override switch being closed in said first position thereof and open in said second position thereof.

9. A communication receiver for receiving carrier signals modulated by at least one control tone and intelligence, said receiver comprising a processing circuit for receiving the modulated signals and detecting the control tone and the intelligence therein, a decoder circuit coupled to said processing circuit and responsive to the control tone for generating at the output thereof a control signal, an electronic switching means coupled to the output of said decoder circuit and responsive to the control signal to provide an enabling signal, said electronic switching means including timing means and a manual switch having a first position coupling said timing means in circuit in said electronic switching means to cause said enabling signal to extend for a predetermined time interval, said manual switch being movable to a second position thereof to take said timing means out of circuit with said electronic switching means and cause said enabling signal to terminate with said control tone, an audio amplifier circuit having a first input coupled to said processing circuit and a second input coupled to said electronic switching means, said audio amplifier circuit being rendered operative by said enabling signal for said predetermined time interval to amplify the detected intelligence from said processing circuit, and a speaker coupled to the output of said audio amplifier circuit to convert the amplified detected intelligence into sound waves.

10. The communication receiver set forth in claim 9, wherein said electronic switching means includes a first transistor of one polarity having an input electrode and an output electrode and a second transistor of an opposite polarity having an input electrode and an output electrode, said switch and said timing means being coupled in series between the output electrode of one transistor and the input electrode of the other transistor, and the input electrode of said one transistor being coupled to the output electrode of said other transistor, the output of said decoder circuit being coupled to the input electrode of said other transistor, the output electrode of said one transistor being coupled to said audio amplifier circuit.

11. The communication receiver set forth in claim 9, wherein said electronic switching means is a monostable multivibrator having first and second conditions, said monostable multivibrator normally being in said first condition and being switchable to said second condition by said enabling signal, said monostable multivibrator automatically reverting to said first condition upon termination of said predetermined time interval when said switch is closed, said monostable multivibrator automatically reverting to said first condition upon termination of the control tone when said switch is open.

12. A communication receiver for receiving carrier signals modulated by at least one control tone and intelligence, said receiver comprising a processing circuit for receiving the modulated signals and detecting the control tone and the intelligence therein, a decoder circuit coupled to said processing circuit and responsive to the control tone for generating at the output thereof a control signal, electronic switching means coupled to the output of said decoder circuit and responsive to the control signal to provide an enabling signal, said electronic switching means including timing means and a first switch having a first position coupling said timing means in circuit in said electronic switching means to cause said enabling signal to extend for a predetermined time interval, said first switch being movable to a second position thereof to take said timing means out of circuit with said electronic switching means and cause said enabling signal to terminate with said control tone, an audio amplifier circuit having a first input coupled to said processing circuit and a second input coupled to said electronic switching means, said audio amplifier circuit being rendered operative by said enabling signal for said predetermined time interval to amplify the detected intelligence from said processing circuit, a speaker coupled to the output of said audio amplifier circuit to convert the amplified detected intelligence into sound waves, and a second switch coupling a source of override signal to said electronic switching means and to said audio amplifier circuit, said second switch being movable to a first position for coupling said override signal to said electronic switching means and to said audio amplifier circuit respectively to disable said electronic switching means and to maintain said audio amplifier circuit operative irrespective of whether said control tone is received, said second switch being movable from said first position to a second position to decouple said override signal from said audio amplifier circuit and thereby render said audio amplifier circuit inoperative.

13. A communication receiver for receiving carrier signals modulated by at least one control tone, said receiver comprising a processing circuit for receiving the modulated signals and detecting the control tone therein, a decoder circuit coupled to said processing circuit and responsive to the control tone for generating at the output thereof a control signal, electronic switching means coupled to the output of said decoder circuit and responsive to the control signal to provide an enabling signal, said electronic switching means including timing means to cause said enabling signal to extend for a predetermined time interval beyond the termination of the control tone, an annunciator circuit having a first input coupled to said processing circuit and a second input coupled to said electronic switching means, said annunciator circuit being rendered operative by said enabling signal for said predetermined time interval, and a mechanical override switch coupling a source of override signal to said electronic switching means and to said annunciator circuit, said mechanical override switch being movable to a first position for coupling said override signal to said electronic means and to said annunciator circuit respectively to disable said electronic switching means and to maintain said annunciator circuit operative irrespective of whether said control tone is received, said mechanical override switch being movable from said first position to a second position to decouple said override signal from said annunciator circuit and thereby render said annunciator circuit inoperative.

14. The communication receiver set forth in claim 13, wherein said annunciator includes an audio amplifier and a speaker coupled thereto.

* * * * *